US008984267B2

(12) United States Patent
Tearse-Doyle

(10) Patent No.: US 8,984,267 B2
(45) Date of Patent: Mar. 17, 2015

(54) PINNING BOOT DATA FOR FASTER BOOT

(71) Applicant: Apple Inc., Cupertino, CA (US)

(72) Inventor: Brian K. Tearse-Doyle, San Jose, CA (US)

(73) Assignee: Apple Inc., Cupertino, CA (US)

( * ) Notice: Subject to any disclaimer, the term of this patent is extended or adjusted under 35 U.S.C. 154(b) by 181 days.

(21) Appl. No.: 13/632,086

(22) Filed: Sep. 30, 2012

(65) Prior Publication Data
US 2014/0095856 A1 Apr. 3, 2014

(51) Int. Cl.
*G06F 9/44* (2006.01)
(52) U.S. Cl.
CPC .................................. *G06F 9/4401* (2013.01)
USPC .......................................................... 713/2
(58) Field of Classification Search
CPC .................................................... G06F 9/4401
See application file for complete search history.

(56) References Cited

U.S. PATENT DOCUMENTS

| 7,631,139 | B2 | 12/2009 | Diehl |
| 8,041,904 | B2 | 10/2011 | Ergan et al. |
| 2003/0005223 | A1* | 1/2003 | Coulson et al. ............... 711/118 |
| 2003/0135729 | A1 | 7/2003 | Mason, Jr. et al. |
| 2005/0246487 | A1* | 11/2005 | Ergan et al. ................... 711/113 |
| 2008/0263305 | A1 | 10/2008 | Shu et al. |
| 2010/0088459 | A1 | 4/2010 | Arya et al. |
| 2010/0217966 | A1 | 8/2010 | Shim |
| 2010/0268874 | A1 | 10/2010 | Pyeon |
| 2011/0153931 | A1* | 6/2011 | Bell et al. ...................... 711/114 |
| 2011/0246821 | A1 | 10/2011 | Eleftheriou et al. |
| 2011/0283066 | A1* | 11/2011 | Kurashige ..................... 711/135 |

FOREIGN PATENT DOCUMENTS

WO 2011076565 A1 6/2011

OTHER PUBLICATIONS

PCT/US2013/060096 International Search Report dated Dec. 26, 2013.
PCT/US2013/060096 Written Opinion of the International Search Report dated Dec. 26, 2013.

* cited by examiner

*Primary Examiner* — Kim Huynh
*Assistant Examiner* — Joshua Neveln
(74) *Attorney, Agent, or Firm* — Womble Carlyle Sandridge & Rice, LLP

(57) ABSTRACT

Methods and apparatus are provided for reducing computer system boot up times in systems with composite HDD-SSD storage devices. Booting a computer system having a composite storage device that includes a magnetic storage device (HDD) and a solid state storage device (SSD) includes identifying boot data read from the magnetic storage device during an initial boot process, pinning the boot data to the solid state storage device, wherein pinning causes the boot data to be retained on the solid state storage device during movement of infrequently-used data from the solid state storage device to the magnetic storage device, and reading, by the computer system, the boot data from the solid state storage device during a subsequent boot process. Booting can also include moving infrequently accessed data from the solid state storage device to the magnetic storage device, and the boot data on the solid state storage device.

18 Claims, 4 Drawing Sheets

PINNING BOOT DATA FOR FASTER BOOT

TECHNICAL FIELD

The present invention relates generally to data storage and retrieval in computer systems. More particularly, the present embodiments relate to booting computer systems from composite storage devices that are hybrids of different types of storage media with different performance characteristics.

BACKGROUND

When a computer system is started, e.g., powered on, a process known as "booting" loads program code instructions, such as an operating system image, into the system's memory, so that the system can begin operations. The code instructions can be loaded from a storage device, such as a magnetic disk drive ("HDD"), a solid state disk ("SSD"), a read-only memory, and so on. Solid state disks store data in devices such as Flash memory chips that have no moving parts and are substantially faster to access than hard disks, and systems that use SSD's often perform operations more quickly and responsively than similar systems that use HDD's, which have moving parts and store data at physical locations that are accessed by moving mechanical mechanisms. However, solid state disk (SSD) storage is more expensive than hard disk (HDD) storage, so HDD's can store much more data than similarly-priced SSD's. There is therefore a tradeoff between performance and cost when deciding whether to use an SSD or an HDD.

SUMMARY

The present application describes various embodiments regarding boot processes in computer systems using composite data storage devices, which have multiple types of storage having differing capacities and performance characteristics.

In one or more embodiments, a computer system can be booted from a composite disk, which is a hybrid of two or more storage devices with different performance characteristics. For example, the composite disk can include a slower device, such as a magnetic hard disk (HDD), and a faster device, such as a solid state disk (SSD). The system boot time can be reduced by identifying boot data that is loaded from the HDD when the system first boots, and storing the identified data on the SSD, so that when the system is subsequently booted, the stored data is read from the SSD at a faster rate than if the data were loaded from the HDD. The boot data can be, for example, an operating system, and can include executable code and data portions of the operating system.

Once the boot process is complete and the system is running, a migration process is run at appropriate times to find rarely used data that is stored on the SSD, and move the rarely used data from the SSD to the HDD. The boot data is not ordinarily accessed while the system is running, and is thus subject to being moved to the slower HDD by the migration process. Therefore the migration process's ordinary behavior of removing the SSD boot data in favor of boot data stored on the HDD is likely to result in a subsequent re-boot of the system being slower (i.e., taking more time) than if the data had been retained in the SSD. To address this problem, the boot data can be identified during the boot process and "pinned" to the SSD, thereby preventing the migration process from moving the boot data to the HDD. In one aspect, the pinning operation is in effect for one boot cycle, so data that was pinned in previous boots but is no longer needed in subsequent boots does not remain on the SSD. A pinning operation is provided to pin data to the SSD. When the pinning operation is performed, if the pinned data is not present on the SSD, it is moved from the HDD to the SSD. Otherwise, if the pinned data is present on the SSD, then it need not be stored as part of the pinning process. In one example, the pinning operation marks the data as pinned. The migration process and other processes that may move data that appears to be infrequently used from the SSD to the HDD do not move data that is marked as pinned.

In one embodiment, a method of booting a computer system is described. The computer system has a composite storage device that includes a magnetic storage device and a solid state storage device, and the method includes identifying, by the computer system, boot data read from the magnetic storage device during an initial boot process, pinning, by the computer system, the boot data to the solid state storage device, wherein pinning causes the boot data to be retained on the solid state storage device during movement of infrequently-used data from the solid state storage device to the magnetic storage device, and reading, by the computer system, the boot data from the solid state storage device during a subsequent boot process.

Embodiments may include one or more of the following features. The method can further include moving, by the computer system, infrequently accessed data from the solid state storage device to the magnetic storage device; and retaining, by the computer system, the boot data on the solid state storage device. Identifying boot data read from the magnetic storage device during an initial boot process can include receiving, by the computer system, a plurality of read operations during system boot, where the boot data comprises data read by the plurality of read operations prior to completion of launching of a plurality of applications that are launched when a user logs in to the system.

Pinning the boot data on the solid state storage device can include ensuring, by the computer system, that the boot data is stored on the solid state storage device, and associating, by the computer system, a pinned value with the boot data, the pinned value indicating that the boot data is to be retained on the solid state storage device. Pinning the boot data can include invoking, by the computer system, a pinning operation of a storage interface, wherein the pinning operation pins the boot data to the solid state storage device, and providing, by the computer system, a location of the boot data to the pinning operation, wherein a migration process is configured to remove rarely used data from the solid state storage device unless the rarely used data is pinned to the solid state storage device. The boot data can include a plurality of data blocks, and identifying boot data read from the magnetic storage device during an initial boot process can include receiving, by the computer system, a plurality of read operations during system boot, where the plurality of read operations includes a plurality of block addresses and associated block lengths, and storing, by the computer system, the plurality of block addresses and associated block lengths in a memory of the computer system.

Pinning the boot data to the solid state storage device can include retrieving, by the computer system, the plurality of block addresses and associated block lengths from the memory of the computer system, invoking, by the computer system, a pinning operation of a storage interface, providing, by the computer system, the plurality of block addresses and associated block lengths to the pinning operation, where the pinning operation is configured to prevent removal of the boot data from the solid state storage device. Pinning the boot data on the solid state storage device can include ensuring that the plurality of data blocks is stored on the solid state storage device, and preventing subsequent removal of the data blocks from the solid state storage device.

In another embodiment, a system is described. The system includes a composite storage device that includes a magnetic storage device and a solid state storage device; and a processor configured to identify boot data read from the magnetic storage device during an initial boot process, store the boot data on the solid state storage device, move infrequently accessed data from the solid state storage device to the magnetic storage device, retain the boot data on the solid state storage device at least until a subsequent boot process is performed, and read the boot data from the solid state storage device during the subsequent boot process.

Embodiments can include one or more of the following features. The processor can be further configured to pin the boot data to the solid state storage device, wherein pinning causes the boot data to be retained on the solid state storage device during movement of infrequently-used data from the solid state storage device to the magnetic storage device. To identify boot data read from the magnetic storage device during an initial boot process, the processor can be configured to intercept read operations during system boot, wherein the boot data comprises data read by the read operations during system boot. The boot data can include data read by the read operations prior to completion of launching of a plurality of applications that are launched when a user logs in to the system.

To pin the boot data on the solid state storage device the processor can be configured to determine whether the boot data is stored on the SSD, store the boot data on the SSD in response to determining that the boot data is not stored on the SSD, and prevent migration of the boot data from the solid state storage device to the magnetic storage device. To pin the boot data the processor can also be configured to invoke a pinning operation of a storage interface with a location of the boot data as a parameter, where the pinning operation is configured to ensure that the boot data is stored on the solid state storage device, and to mark the data as pinned, and marking data as pinned prevents a migration process from moving the data from the solid state storage device to the magnetic storage device.

The boot data can include a plurality of data blocks, and to identify boot data read from the magnetic storage device during an initial boot process the processor can be configured to receive a plurality of read operations during system boot, where the plurality of read operations includes a plurality of block addresses and associated block lengths, and store the plurality of block addresses and associated block lengths in a memory of the computer system.

To pin the boot data to the solid state storage device the processor can be configured to retrieve the plurality of block addresses and associated block lengths from the memory of the computer system, invoke a pinning operation of a storage interface, and provide the plurality of block addresses and associated block lengths to the pinning operation, where the pinning operation is configured to prevent removal of the boot data from the solid state storage device. To pin the boot data, the processor can be further configured to mark the data as pinned, and the migration process can be configured to remove rarely used data from the solid state storage device unless the rarely used data is marked as pinned to the solid state storage device.

In another embodiment, a non-transitory computer readable medium for a computer system is described. The non-transitory computer readable medium has stored thereon computer program code executable by a processor, the computer system including a composite storage device that includes a magnetic storage device and a solid state storage device, the computer program code comprising computer program code that causes the processor to identify boot data read from the magnetic storage device during an initial boot process, to pin the boot data to the solid state storage device, to retain the pinned boot data on the solid state storage device at least until a subsequent boot process is performed, and to read the boot data from the solid state storage device during the subsequent boot process.

Embodiments can include one or more of the following features. The computer program code that causes the processor to pin the boot data can cause the processor to invoke a pinning operation of a storage interface; and computer program code that causes the processor to provide a location of the boot data to the pinning operation, where the location includes an address and a length of the boot data. The computer program code that causes the processor to pin the boot data can include computer program code that causes the processor to invoke a pinning operation of a storage interface with a location of the boot data as a parameter, where the pinning operation is configured to ensure that the boot data is stored on the solid state storage device, and to mark the data as pinned, where marking data as pinned prevents a migration process from moving the data from the solid state storage device to the magnetic storage device.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Figure 1:
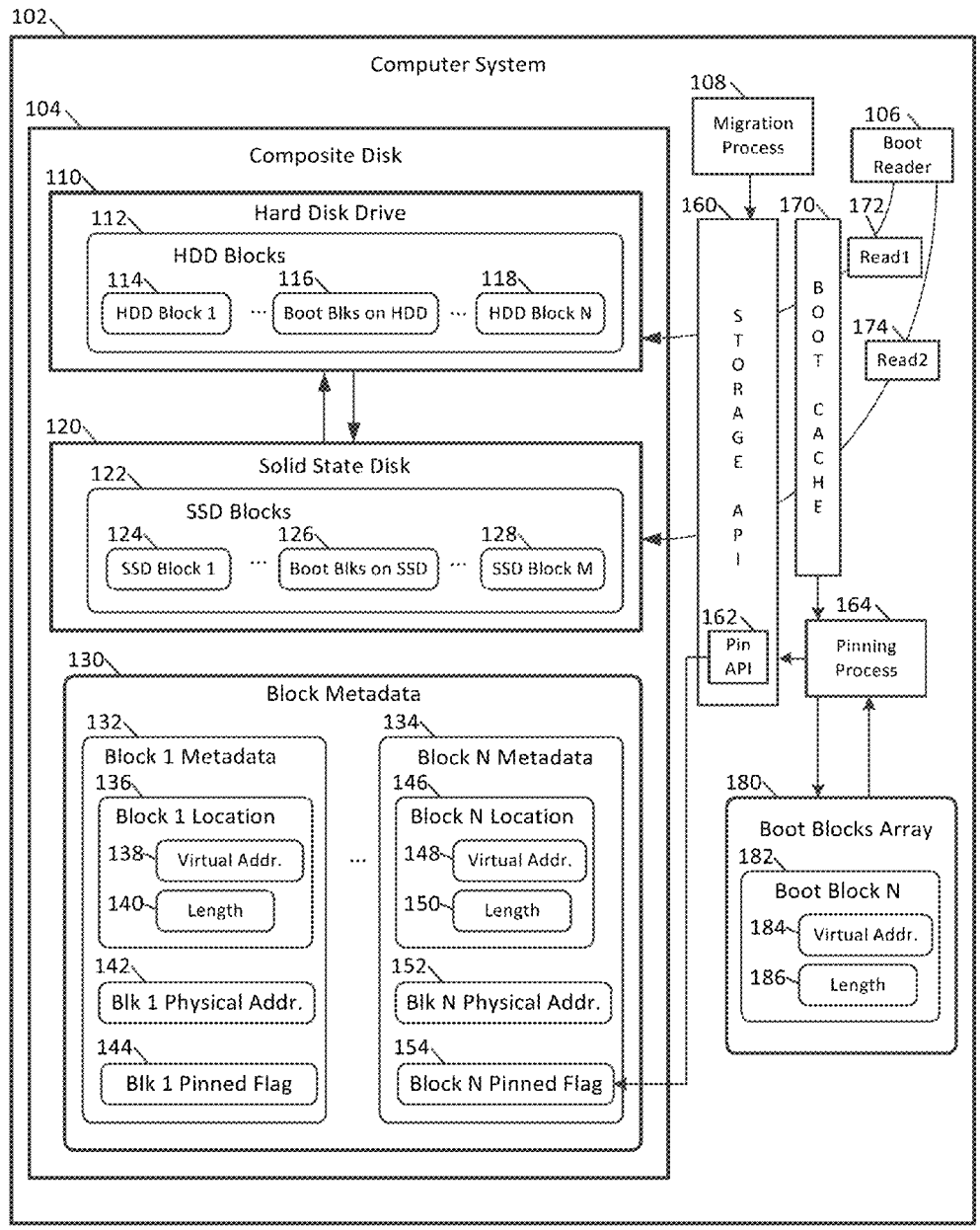
FIG. 1 is a representative block diagram showing a computer system having a composite disk on which boot data can be pinned in accordance with one or more embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting. In particular, the following detailed description often refers to storage devices that have different performance characteristics using the terms magnetic hard disk (HDD) and solid state disk (SSD), but it is understood that this usage is merely an example to enable one skilled in the art to practice the described embodiments. It is further understood that this example is not limited to SSD and/or HDD devices; such that other embodiments may be used, and changes may be made without departing from the spirit and scope of the described embodiments.

In one or more embodiments, a computer system can be booted from a composite disk, which is a hybrid of two or more storage devices with different performance characteristics. For example, the composite disk can include a slower device, such as a magnetic hard disk (HDD) and a faster device with relatively smaller storage capacity, such as a solid state disk (SSD). The faster device can have relatively larger storage capacity, and the slower device can have a relatively smaller storage capacity. The system boot time can be reduced by identifying boot data that is loaded from the HDD when the system first boots, and storing the identified data on the SSD, so that when the system is subsequently booted, the stored data is read from the SSD at a faster rate than if the data were loaded from the HDD. The boot data can be, for example, an operating system, and can include executable code and data portions of the operating system.

Once the boot process is complete and the system is running, a migration process is run at appropriate times to find rarely used data that is stored on the SSD, and move the rarely used data from the SSD to the HDD. Conversely, frequently-accessed data can be moved from the HDD to the SSD, e.g., by the migration process. The boot data is not ordinarily accessed while the system is running, and is thus subject to being moved to the slower HDD by the migration process. Therefore the migration process's ordinary behavior of removing the SSD boot data in favor of boot data stored on the HDD is likely to result in a subsequent re-boot of the system being slower (i.e., taking more time) than if the data had been retained in the SSD. To address this problem, the boot data can be identified during the boot process and "pinned" to the SSD, thereby preventing the migration process from moving the boot data to the HDD. A pinning operation is provided to pin data to the SSD. When the pinning operation is performed, if the pinned data is not present on the SSD, it is moved from the HDD to the SSD. Otherwise, if the pinned data is present on the SSD, then it need not be stored as part of the pinning process. In one example, the pinning operation marks the data as pinned. The migration process and other processes that may move data that appears to be infrequently used from the SSD to the HDD do not move data that is marked as pinned.

FIG. 1 is a representative block diagram showing a computer system 102 having a composite disk 104 on which boot data can be pinned in accordance with one or more embodiments. The computer system 102 is, for example, a desktop computer, laptop computer, net book computer, etc. The computer system 102 includes data storage devices, which are referred to herein as "disks" or "disk drives" even though they do not necessarily have physical disks.

In one or more embodiments, the computer system 102 can have a composite disk 104, which includes two or more storage devices with different performance characteristics. In the example of FIG. 1, the composite disk 104 includes an HDD 110 and a SSD 120. The SSD 120 is a relatively fast device, and the HDD 110 is a relatively slow device with larger storage capacity and lower cost than the SSD 120. Thus, some of the data stored by the composite disk 104 can be stored on the HDD 110, and some of the data can be stored on the SSD 120. The composite disk 104 is designed to provide benefits of both the HDD 110 the SSD 120. A composite disk can provide high performance, approaching that of an SSD, with the larger capacity and lower cost of an HDD. Composite disks achieve these benefits by taking advantage of the repetitive nature of many disk operations and the fact that most disk operations access a relatively small subset of the data stored on the disk.

Data stored on the composite disk can be moved between the HDD and the SSD with the goal of storing data that is needed to achieve faster system performance and response times on the SSD, and other data on the HDD. The storage capacity of the SSD is ordinarily smaller than the capacity of the HDD, so a migration process 108 is performed by the operating system or other component of the computer system, such as a storage Application Programming Interface (API) 160 (e.g., the CoreStorage system in Mac OS X™ from Apple, Inc., or the like). The migration process 108 moves data between the HDD and the SSD using the storage API 160, thereby enabling computer software applications and the user to access the composite disk 104 as a single storage device, without being aware that there are two different devices (i.e., the HDD 110, and the SSD 120). That is, the HDD 110 and SSD 120 are presented to the user as a single disk via the composite disk 104, and the user does not ordinarily control whether data is stored on the HDD 110 or the SSD 120.

In one or more embodiments, during boot, when a request to access data is sent to the composite disk 104, e.g., an initial read operation 172 sent by a boot reader 106, the data is received by a Boot Cache 170, which invokes a pinning process 164 to pin boot data to the SSD 120, as described below. The Boot Cache 170 forwards the access request to the storage API 160, which determines whether to route the request to the HDD 110 or the SSD. 120. The storage API also maps virtual disk addresses to physical disk addresses and handles pinning via a pin API 162, as described below. The pin API 162 has a "pin" operation that instructs the storage API 160 ensure that data starting at a given virtual block address and continuing for a given number of bytes is and remains stored on a given online storage volume, such as the SSD 120. For example, the pinning operation and sets a pinned flag 144 of the block's metadata 132 to true to indicate that the block has been pinned to the SSD. Also, if the block identified by the given address is not on the SSD 120, the storage API 160 moves the block to the SSD 120.

Since the SSD is faster, but has less storage capacity than the HDD, it is desirable to store commonly-accessed data, such as data that is important to maintaining the responsiveness of the computer system, on the SSD, and desirable to store rarely accessed data on the HDD. Data is stored on the HDD 110 and SSD 120 as a set of HDD blocks 112 and a set of SSD blocks 122, respectively. Each block contains a portion of the stored data. The term "data" as used herein includes program code as well as data used by the program code, since the program code instructions are represented as data in the computer system. In one or more embodiments, the data blocks stored on the HDD 110 and the SSD 120 include data values, are stored at particular addresses on the devices, and have associated lengths, e.g., in bytes. The HDD blocks 112 include an HDD Block1 114, a number of HDD boot blocks 116 (which are not present if all of the boot blocks have been moved to the SSD), and an HDD BlockN 118, which indicates that there can be a number (N) of HDD blocks 112. The SSD blocks 122 include an SSD Block1 124, a number of SSD boot blocks 126 (which are not present if all boot blocks reside on the HDD), and an SSD BlockM 128, indicates that there can be a number (M) of SSD blocks.

In one or more embodiments, the composite disk 104 includes block metadata 130, including Block1 metadata and BlockN metadata 134, which is information that describes properties of the corresponding HDD blocks 112 and SSD blocks 122. The metadata 132 for each data block includes as a virtual (i.e., logical) location 136 of the block. The Storage API 160, including the Pin API 162, uses the virtual addresses when referring to HDD blocks 112 and SSD blocks 122. The virtual location 136 includes a virtual address 138 and a length 140 of the data block. The virtual location is mapped to a physical address 142, which identifies a location at which a data block is stored on the HDD 110 or SSD 120. The block metadata 132 also includes a pinned flag 144, which is set to true if the corresponding SSD block (e.g., SSD Block1 124) is pinned to the SSD 120, as described below.

To provide the composite disk's feature of storing commonly-accessed data on the SSD, a migration process 108 moves the HDD blocks 112 and SSD blocks 122 between the HDD and the SSD based on factors such as past access patterns of the data and the availability of space on the SSD. The migration process 108 can execute continuously or periodically, and moves one or more infrequently accessed SSD blocks 122 that are located on the SSD 120 to the HDD 110, e.g., by copying the infrequently accessed SSD blocks 122 to the HDD 110 and deleting them from the SSD 120. The migration process 108 can also move one or more frequently accessed HDD blocks 112 from the HDD 110 to the SSD 120 to improve performance.

In one or more embodiments, when the computer system 102 is booted, a boot reader 106 reads boot data, e.g., the HDD boot blocks 116 and/or SSD boot blocks 126, from the their respective disk(s) in read operations 172, 174. The boot data includes program code and data that is loaded into the computer system 102 when the computer is powered on, e.g., the boot reader 106, an operating system image, or other code instructions that control the computer system 102.

In one or more embodiments, when the computer system 102 is booted, the boot data can be identified and recorded in a boot blocks array 180 by recording the disk operations (e.g., reads) that occur during the boot process. For example, the first time the computer system 102 is booted, the boot reader 106 performs initial boot read operations 172, which read the HDD boot blocks 116 (e.g., the operating system image) from the HDD 110. As each of the HDD boot blocks 116 is read from the HDD, a pinning process 164 intercepts (e.g., is notified of) the read operation 172, and records information about the block in a boot blocks array 180 in a memory of the computer system 102. The pinning process 164 may be invoked by, for example, the Boot Cache 170 upon receipt of the read request 172. For each boot block read, the pinning process 164 records a boot block entry 182, which includes the virtual address 184 of the block (copied from the virtual address 138 of the block metadata 130) and the length 186 of the block (copied from the length 140 of the block metadata 130).

When the pinning process 164 determines that the boot process is complete, e.g., when the applications launched at or prior to login have finished launching, or when all of the HDD boot blocks 116 have been read, or when some other condition is detected, then the pinning process 164 pins the boot data to the SSD 120 by invoking a pinning operation of the pin API 162 with the boot block address 184 and length 186 of each recorded block 182, as well as an identifier for the composite disk 104, as arguments. The pinning operations ensure that the blocks read from the HDD 110 are stored on the SSD 120 as SSD boot blocks 126, and sets the pinned flags 144 of the metadata 130 associated with the boot blocks 126 to true.

In other embodiments, the pinning process 164 can invoke the pinning operation for each block at the time the block is read, so that the block need not be stored in the boot blocks array 180. Thus, data that is not recorded can also be pinned. The choice of whether to use the boot blocks array 180 to record the blocks in a bulk operation is a design decision that can be made based upon factors such as the performance and resource usage of the two alternatives.

In one or more embodiments, in a subsequent boot (i.e., reboot) of the computer system 102, the boot reader 106 issues subsequent read operations 174. Since the boot blocks 126 are stored on the SSD 120, the subsequent read operations 174 read the boot blocks 126 from the SSD. The subsequent read operations 174 are thus faster than the initial read operations 172 performed in the initial boot (prior to pinning the boot blocks 126 to the SSD 120), because SSD read operations are faster than HDD read operations. It is possible that some of the subsequent read operations 174 read HDD boot blocks 116 from the HDD, since some data can change each time the computer system 102 is rebooted.

In one or more embodiments, in subsequent boots, the pinning process described above is performed in subsequent boots (i.e., reboots) of the system. That is, each time the computer system 102 is booted, the HDD boot blocks 116 and SSD boot blocks 126 read at boot time from the HDD 110 and/or the SSD 120 are pinned (or re-pinned if already pinned) to the SSD 120. Any HDD boot blocks 116 read from the HDD during each boot are moved to the SSD 120 as part of the pinning operations. The pinned blocks are read from the SSD 120 on a subsequent reboot, as described above. Thus, the pinned data is maintained as a close approximation of the data that will be read during the next boot. Further, in one or more embodiments, the pinning operation is in effect for one boot cycle, so data that was pinned in previous boots that is no longer needed in subsequent boots does not remain on the SSD 120.

In one or more embodiments, the boot blocks 126 stored on the SSD 120 are subject to removal by a migration process 108 unless the boot blocks 126 are pinned to the SSD. The migration process 108 identifies data stored on the SSD 120 that is unlikely to benefit from the SSD's higher access speeds, and moves the identified data from the SSD to the HDD, thereby making the space available for use by other data that may be more frequently accessed. However, the HDD boot blocks 116 and SSD boot blocks 126, which contain the operating system image (code and data) that is loaded into memory from a disk when the computer is booted up, are not ordinarily accessed after the boot process is complete, and the boot data is therefore likely to be moved from the SSD to the HDD by the migration process 108 once the computer system 102 has completed the boot-up process and is running. Moving the boot data from the SSD to the HDD results in greater boot times because of the slower nature of the HDD.

The pinning operation performed by the pinning process 164 ensures that the boot blocks 126 are not moved off of the SSD by the migration process or some other process. The pinning process 165 sets the setting pinned flags 144, 154 stored in metadata 132, 134 associated with the HDD boot blocks 116, SSD boot blocks 126 to true to prevent the migration process 108 or other component of the computer system 102 from moving the SSD boot blocks 126 off of the SSD 120 to the HDD 110. The migration process 108 (and other processes on the computer system 102) check the value of the pinned flags 144, 154, and do not move SSD data blocks 133 from the SSD 120 to the HDD 110 if the pinned flags 144, 154 corresponding to the blocks 133 are true. Thus, the pinning operation, e.g., setting the pinned flag in the block metadata 130 for the blocks to be pinned (which is referred to as pinning the data to the SSD) prevents the blocks from being moved from the SSD to the HDD.

Figure 2:
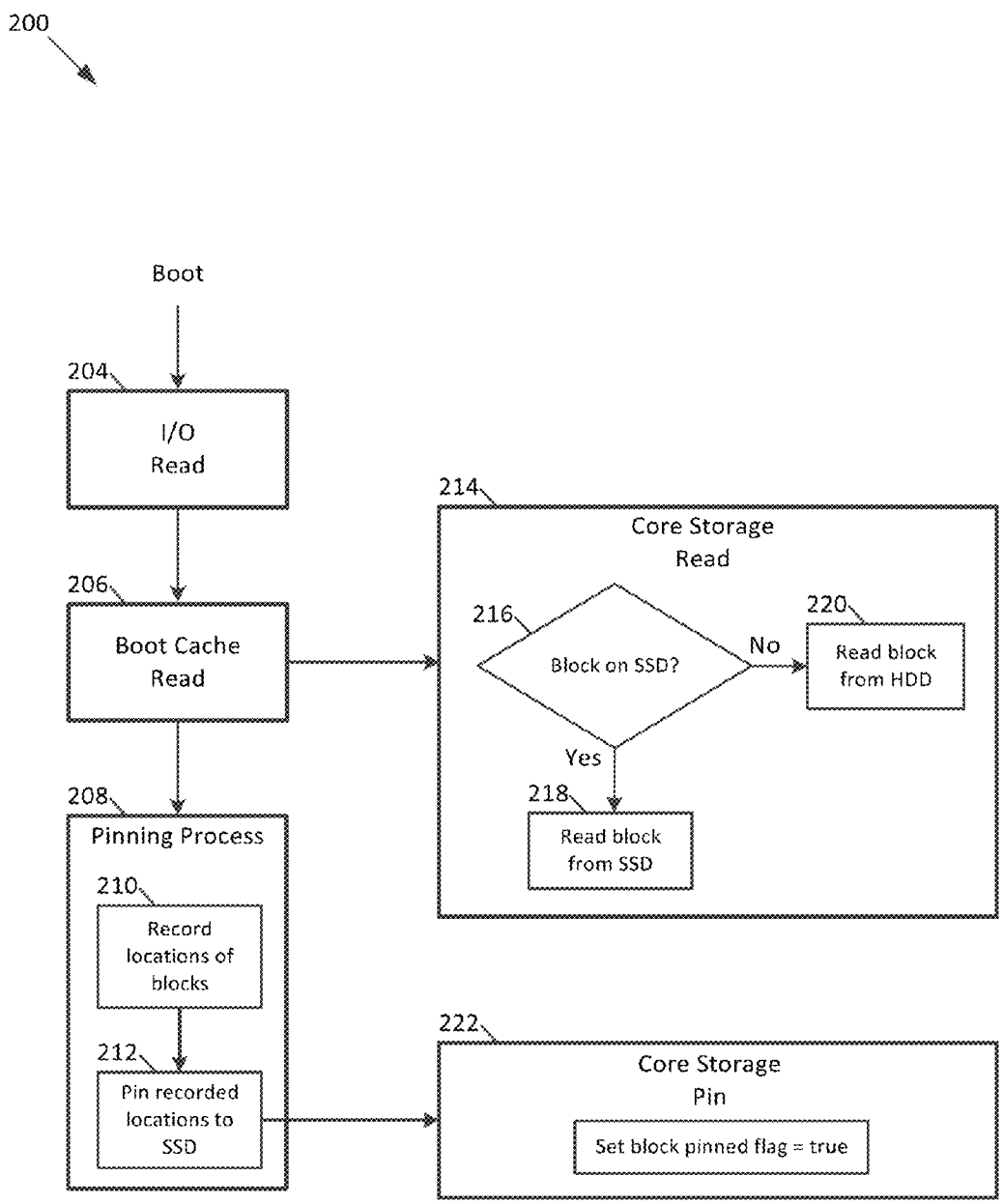
FIG. 2 shows a representative block diagram of a system boot data read path in accordance with one or more embodiments.

FIG. 2 shows a representative block diagram of a system boot data read path 200 in accordance with one or more embodiments. A boot operation begins with an input/output (I/O) read operation 204 to read boot data from a storage device. The I/O read operation 204 performs a Boot Cache read operation 206 to check for cached boot data that may have been previously stored. In this case, there is no cached boot data, so the Boot Cache read operation 206 performs a CoreStorage read operation 214 to read the boot data from the storage device. The read operation 214 can be provided by, for example, the storage API 160 of FIG. 1. The read operation 214 determines (at 216) whether the block to be read is located on the SSD or the HDD. If the block is on the SSD, the block is read from the SSD (218). Otherwise, the block is read from the HDD (220). The Boot Cache read operation 206 also performs a pinning process 208 to pin the boot data received in the read operation 214 to the SSD. The pinning process 208 records the locations of the blocks read by the read operation 214, and performs a pinning operation 212 to pin the recorded block locations to the SSD so that the corresponding blocks will not be moved from the SSD to the HDD. The pinning operation is performed at block 222 by, for example, performing a CoreStorage pinning operation of the ping API 162 of FIG. 1, which can set a pinned flag 144 associated with the block to true to indicate that the block is pinned to the SSD. In one example, during an initial system boot, in which data has not previously been explicitly pinned to the SSD, the read operation 214 reads approximately 50% of the blocks from the SSD at 218, and remaining portion of the blocks is read from the HDD at 220. After the pinning operations 222 have been performed by the pinning process 208, and the computer system is re-booted, 95% of the bocks are read from the SSD at 218, and only 5% are read from the HDD at 220, thus resulting in a significant reduction in boot time.

Figure 3:
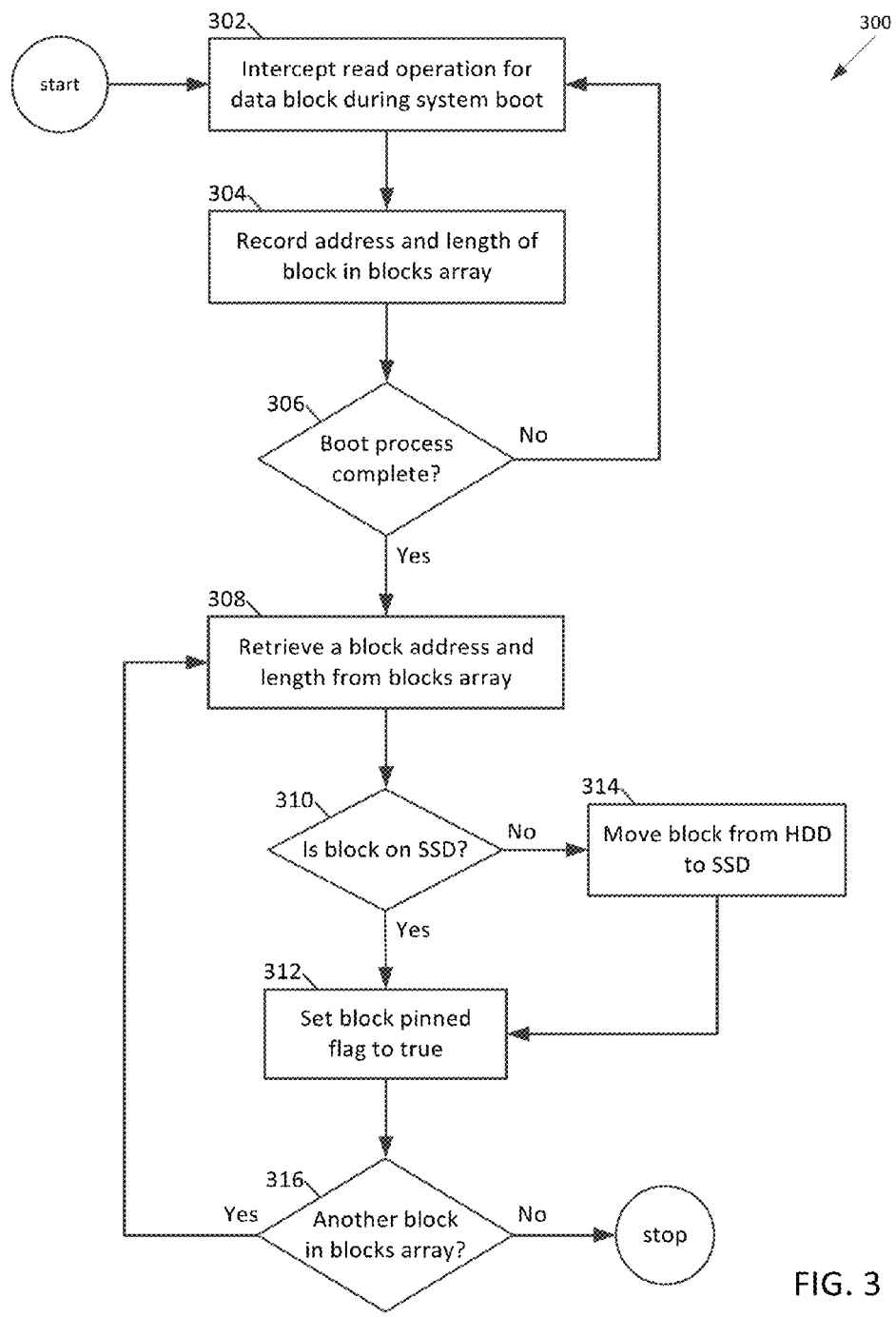
FIG. 3 shows a representative flowchart of a boot data pinning process in accordance with one or more embodiments.

FIG. 3 shows a representative flowchart of a boot data pinning process 300 in accordance with one or more embodiments. Process 300 can represent the pinning process 164 of FIG. 1 and can be implemented as, for example, computer program code encoded on a computer readable medium and executable by a processor of a computer system. Process 300 can be invoked by the Boot Cache 170 or the boot reader 106 of FIG. 1. The process begins at block 302, which intercepts a read operation 172 that reads a data block when a computer system is booting. The read operation 172 can be intercepted by, for example, modifying an operating system read system call or function to invoke the process 300 before or after performing the read operation 172, or by otherwise registering for and receiving notifications of boot-time data read operations performed by the operating system. Block 304 records the address and length of the data block in an array of blocks, referred to herein as a "blocks" array, and corresponding to the Boot Blocks Array 180 of FIG. 1.

Block 306 determines whether the boot process is complete, e.g., whether start up operations such as launching applications requested at logon have completed. If the boot process is not yet complete, control returns to block 302, which intercepts another read operation to receive another data block and block 304 stores the address and length of the data block in the array of blocks. If block 306 determines that the boot process is complete, e.g., because the applications that are launched when a user logs in have finished launching (i.e., initializing), or because no more boot data is available to be read, or some other condition indicates the end of the boot data. In one example, the data blocks read by the applications that have been launched are not included in the boot data, since these data blocks can be relatively numerous.

Block 308 retrieves a block address and length of one of the previously-read blocks from the blocks array. Block 310 determines whether the block identified at 308 is on the SSD. If not, block 314 moves the block from the HDD to the SSD, which can include deleting the block from the HDD. Further, block 312 sets the block's pinned flag to true, e.g., by invoking a pin API 162. Block 316 determines if there is another block in the blocks array that has not yet been retrieved at block 308. If so, control transfers to block 308, and the pinning operation is repeated for that block. Otherwise, once the blocks in the array have been pinned, the process ends.

Figure 4:
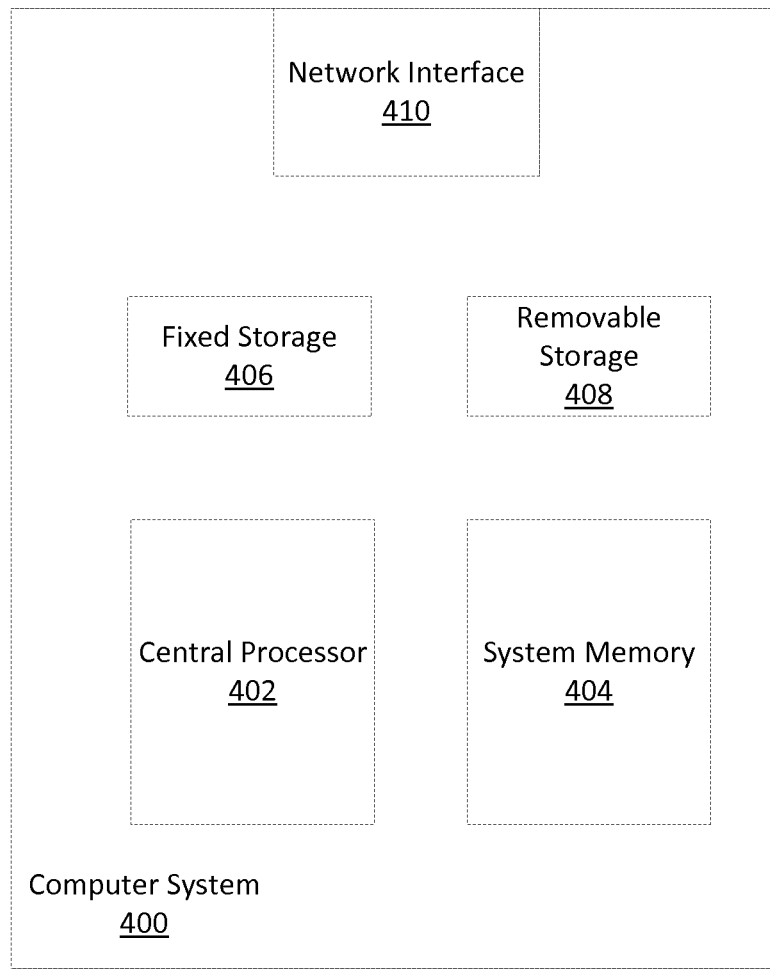
FIG. 4 shows a system block diagram of computer system used to execute the software of an embodiment.

FIG. 4 shows a system block diagram of computer system 400 used to execute the software of an embodiment. Computer system 400 includes subsystems such as a central processor 402, system memory 404, fixed storage 406 (e.g., hard drive), removable storage 408 (e.g., FLASH), and network interface 410. The central processor 402, for example, can execute computer program code (e.g., an operating system) to implement the invention. An operating system is normally, but necessarily, resident in the system memory 404 during its execution. Other computer systems suitable for use with the invention may include additional or fewer subsystems. For example, another computer system could include more than one processor 402 (i.e., a multi-processor system) or a cache memory.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method of booting a computer system, the computer system having a composite storage device that includes a magnetic storage device and a solid state storage device, the method comprising:

by the computer system:
during an initial boot process:
identifying boot data read from the magnetic storage device, and
performing a first pinning operation to pin the boot data to the solid state storage device, wherein the first pinning operation comprises:
ensuring that the boot data is stored on the solid state storage device, and
associating a pinned value with the boot data, the pinned value indicating that the boot data is to be retained on the solid state storage device;
when the initial boot process is complete:
initiating a migration process,
wherein the migration process:
identifies infrequently-used data stored on the solid state storage device, the infrequently-used data comprising the boot data and other data,
moves the other data from the solid state storage device to the magnetic storage device while retaining the boot data on the solid state storage device, and retains the boot data based on the pinned value associated with the boot data; and during a subsequent boot process:
reading the boot data that has been retained on the solid state storage device, and
when additional boot data is read from the magnetic storage device, performing a second pinning operation to pin the additional boot data to the solid state storage device.

2. The method of claim 1, wherein identifying boot data read from the magnetic storage device during the initial boot process comprises:
receiving, by the computer system, a plurality of read operations during system boot,
wherein the boot data comprises data read by the plurality of read operations prior to completion of launching of a plurality of applications that are launched when a user logs in to the computer system.

3. The method of claim 1, wherein performing the first pinning operation comprises:
by the computer system:
invoking the first pinning operation of a storage interface; and
providing a location of the boot data to the first pinning operation.

4. The method of claim 1, wherein the boot data comprises a plurality of data blocks, and identifying boot data read from the magnetic storage device during the initial boot process comprises:
by the computer system:
receiving a plurality of read operations during system boot, wherein the plurality of read operations includes a plurality of block addresses and associated block lengths; and
storing the plurality of block addresses and associated block lengths in a memory of the computer system.

5. The method of claim 4, wherein performing the first pinning operation comprises:
by the computer system:
retrieving the plurality of block addresses and associated block lengths from the memory of the computer system;
invoking the first pinning operation of a storage interface; and
providing the plurality of block addresses and associated block lengths to the first pinning operation, wherein the first pinning operation is configured to prevent removal of the boot data from the solid state storage device by the migration process.

6. The method of claim 4, wherein performing the first pinning operation comprises:
ensuring that the plurality of data blocks are stored on the solid state storage device, and
preventing subsequent removal of the plurality of data blocks from the solid state storage device by the migration process.

7. A system comprising:
a composite storage device that includes a magnetic storage device and a solid state storage device; and
a processor configured to:
during an initial boot process:
identify boot data read from the magnetic storage device by intercepting one or more read operations, wherein the boot data comprises data read by the one or more read operations, and
perform a first pinning operation to pin the boot data to the solid state storage device, wherein the first pinning operation comprises ensuring that the boot data is stored on the solid state storage device;
when the initial boot process is complete:
initiate a migration process, wherein the migration process:
identifies infrequently-used data stored on the solid state storage device, the infrequently-used data comprising the boot data and other data,
moves the other data from the solid state storage device to the magnetic storage device, and
retains the boot data on the solid state storage device at least until a subsequent boot process is performed; and
during the subsequent boot process:
read the boot data that has been retained on the solid state storage device, and
when additional boot data is read from the magnetic storage device, perform a second pinning operation to pin the additional boot data to the solid state storage device.

8. The system of claim 7, wherein the first pinning operation causes the boot data to be retained on the solid state storage device during movement of the other data from the solid state storage device to the magnetic storage device.

9. The system of claim 7, wherein the boot data comprises data read by the one or more read operations prior to completion of launching of a plurality of applications that are launched when a user logs in to the system.

10. The system of claim 7, wherein to pin the boot data to the solid state storage device the processor is configured to:
determine whether the boot data is stored on the solid state storage device;
store the boot data on the solid state storage device in response to determining that the boot data is not stored on the solid state storage device; and
prevent migration of the boot data from the solid state storage device to the magnetic storage device.

11. The system of claim 7, wherein to pin the boot data the processor is configured to:
invoke the first pinning operation of a storage interface with a location of the boot data as a parameter,
wherein the first pinning operation is configured to mark the boot data as pinned, and
wherein marking the boot data as pinned prevents the migration process from moving the boot data from the solid state storage device to the magnetic storage device.

12. The system of claim 11, wherein to pin the boot data the processor is further configured to mark the boot data as pinned, and the migration process is configured to remove rarely used boot data from the solid state storage device unless the rarely used boot data is marked as pinned to the solid state storage device.

13. The system of claim 7, wherein the boot data comprises a plurality of data blocks, and to identify boot data read from the magnetic storage device during the initial boot process the processor is configured to:
receive the one or more read operations during system boot, wherein the one or more read operations includes a plurality of block addresses and associated block lengths; and
store the plurality of block addresses and associated block lengths in a memory of the system.

14. The system of claim 13, wherein to pin the boot data to the solid state storage device the processor is configured to:
retrieve the plurality of block addresses and associated block lengths from the memory of the system;
invoke the first pinning operation of a storage interface; and provide the plurality of block addresses and associated block lengths to the first pinning operation,
wherein the first pinning operation is configured to prevent removal of the boot data from the solid state storage device.

15. The system of claim 7, wherein the processor is further configured to:
invoke the first pinning operation that intercepts each read operation of the one or more read operations, wherein the first pinning operation pins the boot data read by the one or more read operations to the solid state storage device, and the first pinning operation is invoked before or after performing the read operation.

16. The system of claim 15, wherein, during the subsequent boot process, the second pinning operation intercepts one or more subsequent read operations, and the boot data retained on the solid state storage device and the additional boot data from the magnetic storage device is read by the one or more subsequent read operations.

17. A non-transitory computer readable medium for a computer system, the non-transitory computer readable medium having stored thereon computer program code executable by a processor, the computer system comprising a composite storage device that includes a magnetic storage device and a solid state storage device, the computer program code configured to cause the processor to:
during an initial boot process:
identify boot data read from the magnetic storage device,
invoke a first pinning operation of a storage interface,
provide a location of the boot data to the first pinning operation, wherein the location comprises an address and a length of the boot data, and
pin the boot data to the solid state storage device;
when the initial boot process is complete:
initiate a migration process, wherein the migration process:
identifies infrequently-used data stored on the solid state storage device, the infrequently-used data comprising the boot data and other data,
moves the other data from the solid state storage device to the magnetic storage device, and
retains the boot data on the solid state storage device at least until a subsequent boot process is performed; and
during the subsequent boot process:
read the boot data from the solid state storage device, and
when additional boot data is read from the magnetic storage device, performing a second pinning operation to pin the additional boot data to the solid state storage device.

18. The non-transitory computer readable medium of claim 17, further comprising computer program code configured to cause the processor to:
invoke the first pinning operation of the storage interface with the location of the boot data as a parameter,
wherein the first pinning operation is configured to ensure that the boot data is stored on the solid state storage device, and to mark the boot data as pinned, and
wherein marking the boot data as pinned prevents the migration process from moving the boot data from the solid state storage device to the magnetic storage device.

* * * * *